United States Patent [19]
Bonin et al.

[11] Patent Number: 5,349,877
[45] Date of Patent: Sep. 27, 1994

[54] METHOD OF MAKING A STARTER HEAD FOR AN INTERNAL COMBUSTION ENGINE, AND A STARTER HEAD MADE BY SUCH A METHOD

[75] Inventors: Viviane Bonin, Villefontaine; Jean François Serrano, Saint Priest, both of France

[73] Assignee: Valeo Equipements Electriques Moteur S.A., Creteil, France

[21] Appl. No.: 22,072

[22] Filed: Feb. 24, 1993

[30] Foreign Application Priority Data

Feb. 25, 1992 [FR] France .................. 92 02147

[51] Int. Cl.⁵ ............... F02N 15/06; F16D 41/00; B23P 11/00
[52] U.S. Cl. .................... 74/6; 74/7 C; 192/42; 192/45; 29/521
[58] Field of Search ........... 192/42, 45; 74/6, 7 R, 74/7 C; 29/521

[56] References Cited

U.S. PATENT DOCUMENTS

| 2,759,364 | 8/1956 | Lewis | 74/6 |
| 4,178,805 | 12/1979 | Mazzorana | 192/45 X |

FOREIGN PATENT DOCUMENTS

| 2253152 | 6/1975 | France . |
| 0369867 | 11/1989 | France . |
| 2639064 | 1/1993 | France . |

*Primary Examiner*—Allan D. Herrmann
*Attorney, Agent, or Firm*—Morgan & Finnegan

[57] ABSTRACT

A starter head for an internal combustion engine features a starter pinion, a driving head, two half rings and a securing cap. In a method of making this starter head: a set of chamfers is formed on the outer periphery of the securing cap so as to form, by local flow of the material of the cap, a set of internal projecting nibs in alignment with the chamfers; the starter pinion is positioned with respect to the driving sleeve; the two half rings are positioned against a camming cage associated with the driving sleeve, thereby completing a sub-assembly; the securing cap is positioned on the said sub-assembly; and the securing cap is reformed in such a way that the half rings become embedded in the nibs.

6 Claims, 3 Drawing Sheets

METHOD OF MAKING A STARTER HEAD FOR AN INTERNAL COMBUSTION ENGINE, AND A STARTER HEAD MADE BY SUCH A METHOD

FIELD OF THE INVENTION

The present invention relates to a method of making a starter head for an internal combustion engine, and to a starter head made by such a method.

BACKGROUND OF THE INVENTION

A starter head typically consists of a starter pinion which is arranged to be displaced axially on a motor shaft until it comes into mesh with a toothed crown carried by and around the flywheel of the engine. A free wheel and a driving sleeve, which are secured together by a securing cap, are associated with the starter pinion. Sealing of the free wheel is obtained by the use of two half rings which are associated with a seal. A starter head of this kind is described for example in the specification of French patent application No. 88 14753 (U.S. Pat. No. 2,639,064).

In the method of making a starter head of this kind, after the driving sleeve has been offered up to the starter pinion (to which the free wheel has already been fitted), the two half rings are positioned on the driving sleeve, the seal is fitted into the securing cap, and the securing cap, carrying the seal, is then offered up on to the sub-assembly consisting of the pinion, the driving sleeve and the half rings. The securing cap is then reformed around the half rings in such a way that the various components mentioned above are thereby secured together. This reforming operation is one of particular delicacy, because it is absolutely essential that the two half rings shall remain at all times perfectly sealed together, so that there is no loss of grease from within the free wheel. Any such escape of grease would lead to damage and eventual failure of the starter as a whole.

In the method just described, it is the seal that acts as the locating means for the two half rings; while the securing cap is being reformed, compression of the seal guarantees total immobilisation of the half rings. However, it is almost impossible to fit the seal into the securing cap, and to maintain it in a precise position, by any automatic (robotic) means. This results in an unacceptable cost of production of the starter, when the starters are to be mass produced as is the case in the motor industry.

DISCUSSION OF THE INVENTION

An object of the present invention is to overcome the above mentioned drawback, and to enable the starter head to be assembled automatically.

According to the invention in a first aspect, a method of making a starter head for an internal combustion engine, in which the starter head comprises a starter pinion, a driving sleeve, two half rings and a securing cap, is characterised by the following steps:

a set of chamfers is formed on the outer periphery of the securing cap so as to form, by local flow of material internally of the cap and in alignment with the chamfers, a set of projecting nibs;

the starter pinion is positioned with respect to driving sleeve;

the two half rings are positioned against a camming cage associated with the driving sleeve, thereby completing a sub-assembly;

the securing cap is positioned on the said sub-assembly; and the securing cap is reformed in such a way that the said half rings become embedded in the nibs.

According to another preferred feature of the invention, there is an odd number of chambers and therefore of nibs.

The chamfers are preferably spaced apart circumferentially at regular intervals.

Preferably, the chamfers are quadrangular in shape, and may for example be square.

According to the invention in a second aspect, a starter head is made by a method according to the said first aspect of the invention.

The description of a preferred embodiment of the invention, which follows, will enable the invention and its application to be more clearly understood. This description is given by way of example only and with reference to the accompanying drawings.

DESCRIPTION OF A PREFERRED EMBODIMENT OF THE INVENTION

Figure 1:
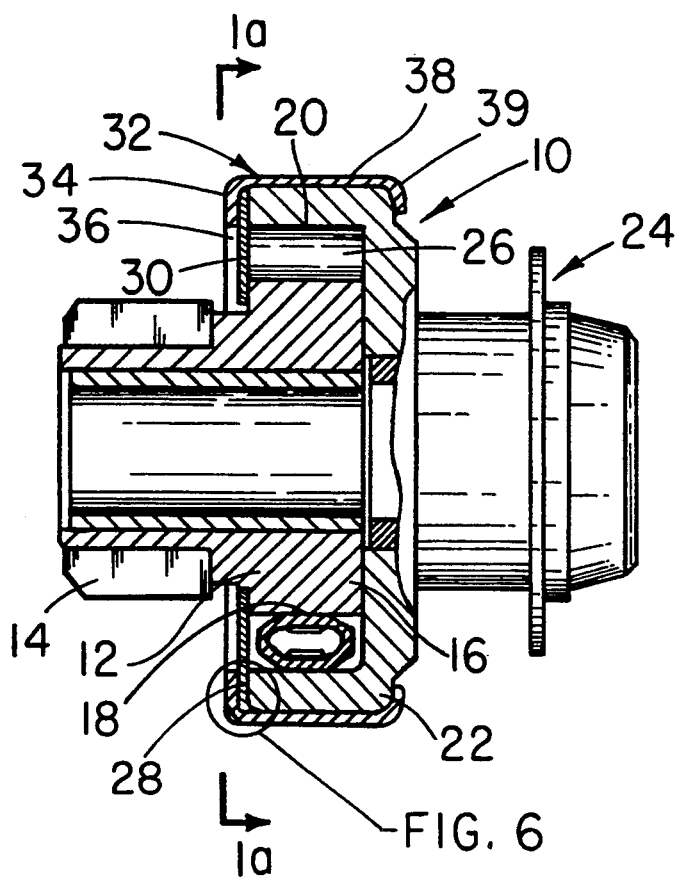
FIG. 1 is a view in axial cross section, showing part of a starter head assembly in accordance with the invention.
Figure 1A:
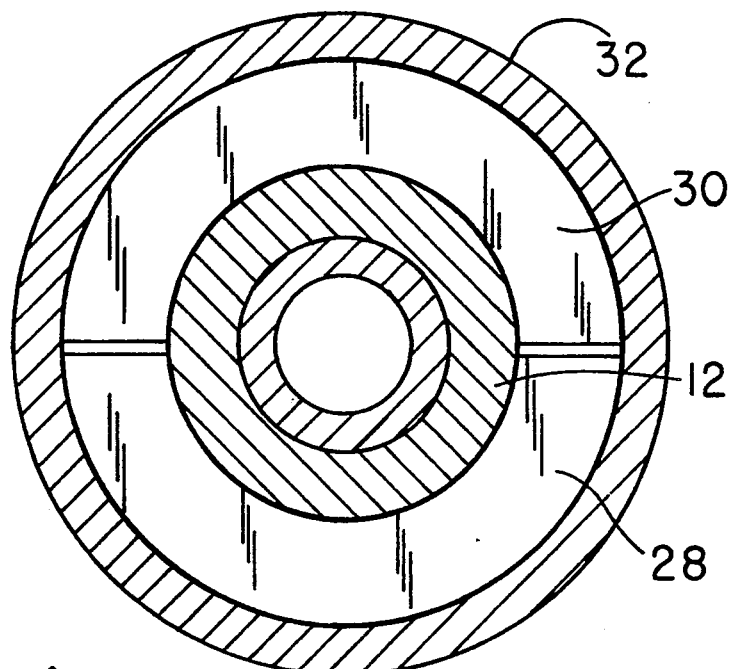
FIG. 1A is a cross-section taken along line 1A—1A of FIG. 1 illustrating the half rings and securing cap.
Figure 2:
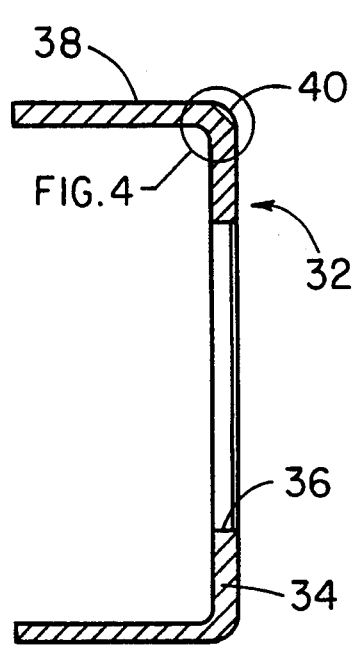
FIG. 2 a cross section taken on the line 2—2 in FIG. 3, on a larger scale than FIG. 1, and shows a securing cap of the starter head in accordance with the invention.

Reference will first be made to FIGS. 1 and 1A, which show a starter head 10 for the starter of an internal combustion engine. FIG. 1 shows the starter head 10 in its fully assembled state. The starter head 10 comprises a starter pinion 12 having a set of teeth 14, which mesh in the usual way with a toothed crown (not shown) arranged around the engine flywheel.

The rear portion 16 of the starter pinion 12 (to the right in FIG. 1) defines the track 18 for a free wheel 20, the camming cage 22 of which is rotatingly associated with a driving sleeve 24. A series of loaded rollers 26 is of course arranged between the track 18 and the cage 20 in the usual way. The free wheel is closed and sealed by two half rings 28 and 30.

The components detailed above are secured together by means of a securing cap 32 which is deformed over the free wheel 20.

The cap 32 and the free wheel will now be described in greater detail with reference to FIGS. 2 to 5. The securing cap 32 is generally dish-shaped, with a flat base 34 in which a hole 36 is formed, and the flat base 34 is joined to a cylindrical wall or skirt 38. The cap 32 is made by press forming from an aluminium sheet blank. During the press forming of the securing cap 32, a series of chamfers 40 (see in FIGS. 4 and 5) are formed on the outer periphery of the flat base 34. These chamfers cause local flow of the metal of the blank towards the interior of the cap 32, thus forming a set of projecting internal nibs aligned with the chamfers 40, i.e. in circumferential positions corresponding to those of the chamfers 40.

The formation of the chamfers 40, and therefore of the nibs 42, is the first step in the method of securing together the components of the starter head. The subsequent steps in the method are as follows. The starter pinion 12 is positioned with the driving sleeve 24, having been previously fitted with the free wheel 28. The two half rings 20 and 30 are then fitted against the camming cage 22 associated with the driving sleeve, after which the securing cap 32, with its nibs 42, is placed in position. Finally, the skirt 38 of the cap 32 is reformed so that it lies snugly against the outer cylindrical surface of the free wheel cage 22 that consists of the two half rings, with the free edge of the skirt 38 being deformed radially inwardly, so as to form the retaining flange 39 which can be seen in FIG. 1.

Figure 6:
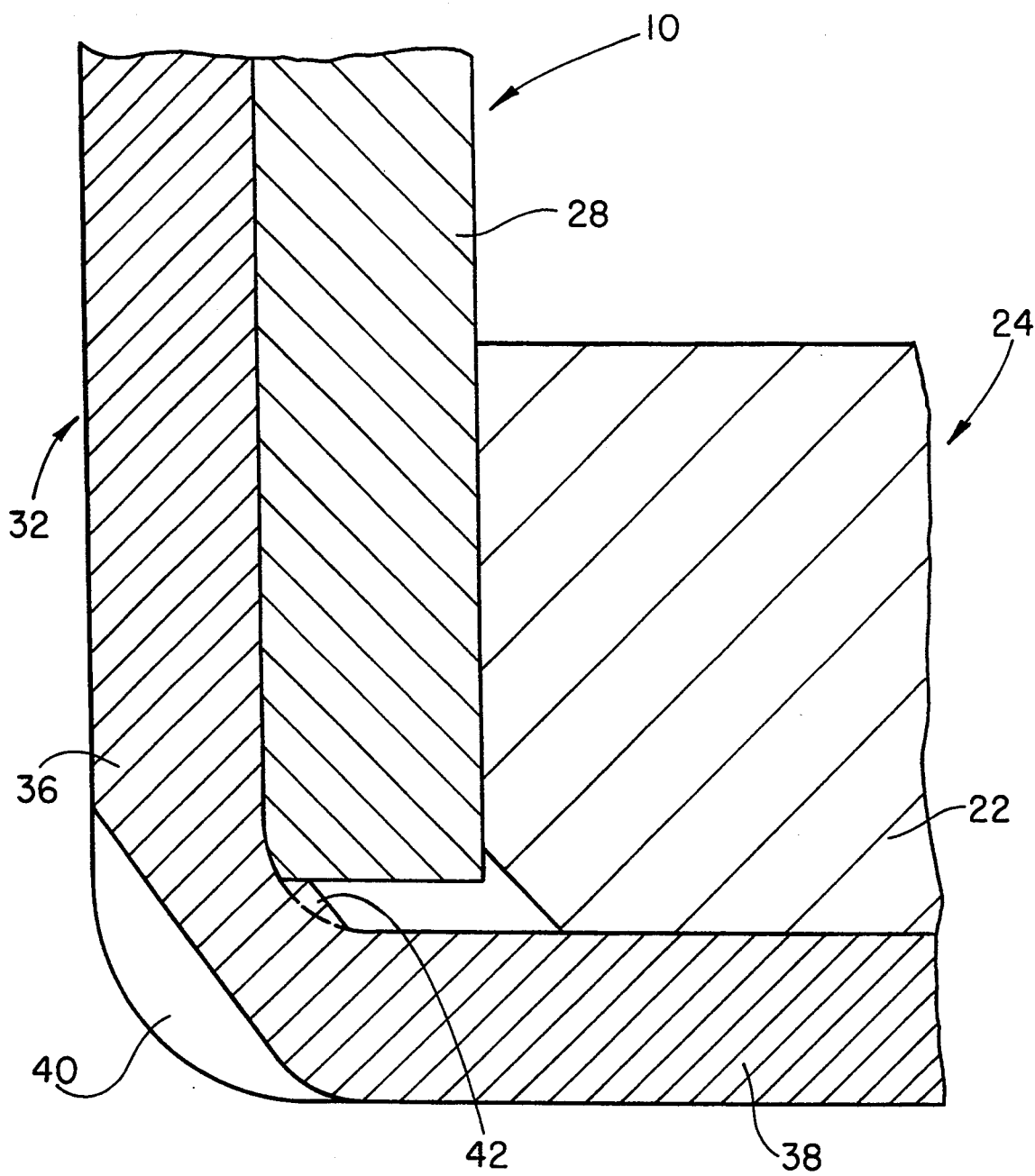
FIG. 6 is a view in axial cross section as depicted at 6 on FIG. 1, on a very much larger scale than FIG. 1, showing part of the assembled starter head.

While the securing cap 32 is being positioned, the nibs 42 enable the half rings 28 and 30 to be located precisely in relation to each other, these half rings being laterally gripped together by the reaction force exerted by the nibs 42. During the operation of reforming the cap 32, the half rings 28 and 30 deform the nibs 42 as can be seen in FIG. 6, so that the half rings become firmly embedded in the nibs, thus ensuring that the half rings are fully immobilised.

All of these operations are easily carried out automatically, and this results in a considerable reduction in the cost of the starter as a whole. In addition, all the components of the starter head are rigid, and the positioning of each component is carried out with precision, resulting in a surprisingly reliable manufacturing operation.

Figure 3:
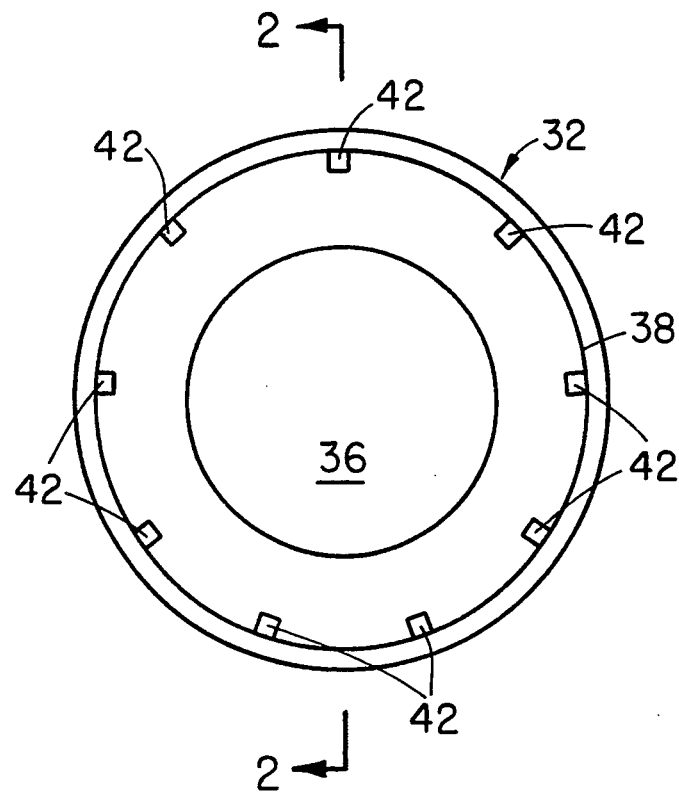
FIG. 3 is a rear view of the same securing cap, seen along line 3—3 from the left hand side of FIG. 2.
Figure 4:
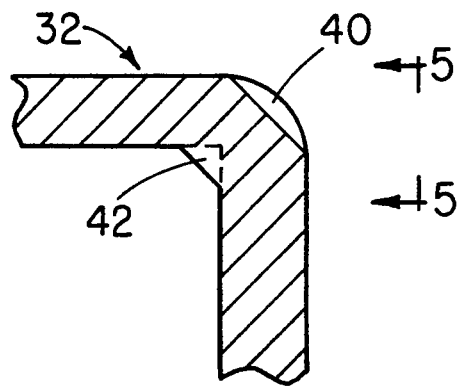
FIG. 4 is a scrap view on a larger scale, showing in cross section the detail of the securing cap indicated at 4 in FIG. 2.

It will be noted, in particular in FIG. 3, that the nibs 42 formed on the securing cap 32 are spaced apart circumferentially at regular intervals, and that there is an odd number of these nibs (9 in the example shown), so that no one of the nibs lies diametrically opposite another one. This prevents any overlapping of the two half rings 28 and 30 taking place during the operation of reforming the cap 32.

Figure 5:
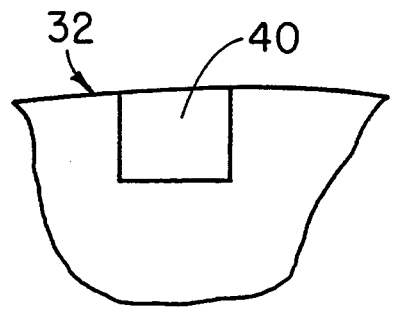
FIG. 5 is a front view as taken along line 5—5 of FIG. 2; of the same detail as is shown in FIG. 4.

The chamfers 40 are preferably of square form, as is shown in particular in FIG. 5.

The present invention is of course not limited to the embodiment described and shown, but embraces any variant which is within the competence of the ordinary person skilled in this technical field. In particular, the shape of the chamfers 40 may be rectangular, or of any other quadrangular shape, without departing from the scope of the invention.

What is claimed is:

1. A method of making a starter head for an internal combustion engine, said starter head comprising: a starter pinion; a driving sleeve; a pair of half rings which together constitute a ring member coupling the starter pinion to the driving sleeve; and a securing cap fitted around the half rings to secure the driving sleeve, the half rings and the starter pinion together, wherein said method comprises the steps of:

forming a set of chamfers on the outer periphery of the securing cap so as to cause local flow of the material of the securing cap, thereby forming, in radial alignment with each chamfer, a projecting nib on the inside surface of the securing cap;

positioning the starter pinion with respect to the driving sleeve;

positioning the two half rings against a camming cage associated with the driving sleeve; and reforming the securing cap against the half rings so that the half rings become embedded in said nibs.

2. A method according to claim 1, wherein the step of forming said nibs comprises forming an odd number of nibs.

3. A method according to claim 2, wherein the step of forming the chamfers on said securing cap comprises forming the chamfers at positions in which they are circumferentially spaced apart at regular intervals.

4. A method according to claim 1, wherein the step of forming the chamfers comprises forming quadrangular chamfers.

5. A method according to claim 4, wherein the method of forming the chamfers comprises forming square chamfers.

6. A starter head for an internal combustion engine, said starter head comprising: a starter pinion; a driving sleeve; a pair of half rings which together constitute a ring member coupling the starter pinion to the driving sleeve; and a securing cap fitted around the half rings to secure the driving sleeve, the half rings and the starter pinion together, wherein the starter head is made by the method according to claim 1.

* * * * *